US009021465B2

(12) United States Patent
Laor

(10) Patent No.: US 9,021,465 B2
(45) Date of Patent: Apr. 28, 2015

(54) DOWNLOADING GUEST SOFTWARE UPDATES BY A HYPERVISOR

(75) Inventor: Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 596 days.

(21) Appl. No.: 12/968,566

(22) Filed: Dec. 15, 2010

(65) Prior Publication Data
US 2012/0159469 A1 Jun. 21, 2012

(51) Int. Cl.
G06F 9/44 (2006.01)
G06F 9/45 (2006.01)
G06F 9/445 (2006.01)
G06F 9/455 (2006.01)

(52) U.S. Cl.
CPC .................... G06F 9/4555 (2013.01)

(58) Field of Classification Search
CPC .......... G06F 8/61; G06F 8/65; G06F 9/45504
See application file for complete search history.

(56) References Cited

U.S. PATENT DOCUMENTS

| 8,205,194 | B2* | 6/2012 | Fries et al. ..................... 717/168 |
| 8,307,358 | B1* | 11/2012 | Koryakina et al. ............. 717/174 |
| 8,473,587 | B1* | 6/2013 | Lappas et al. ................. 709/220 |
| 8,527,982 | B1* | 9/2013 | Sapuntzakis et al. ......... 717/174 |
| 8,631,404 | B2 | 1/2014 | Laor |
| 2002/0133810 | A1* | 9/2002 | Giles et al. ..................... 717/138 |
| 2007/0074199 | A1 | 3/2007 | Schoenberg |
| 2007/0083862 | A1* | 4/2007 | Wooldridge et al. ............. 718/1 |
| 2007/0299990 | A1 | 12/2007 | Ben-Yehuda et al. |
| 2008/0189697 | A1 | 8/2008 | Kachroo et al. |
| 2008/0244553 | A1 | 10/2008 | Cromer et al. |
| 2008/0288695 | A1* | 11/2008 | Post et al. ..................... 710/266 |
| 2009/0125902 | A1* | 5/2009 | Ghosh et al. ..................... 718/1 |
| 2009/0313446 | A1 | 12/2009 | Schuba et al. |
| 2010/0287544 | A1* | 11/2010 | Bradfield et al. ............. 717/172 |
| 2011/0197256 | A1 | 8/2011 | Sharkey et al. |
| 2012/0159469 | A1* | 6/2012 | Laor ............................. 717/173 |
| 2014/0173589 | A1* | 6/2014 | Babol et al. ................... 717/174 |

OTHER PUBLICATIONS

Gebhardt et al., Separating hypervisor trusted computing base supported by hardware, Oct. 2010, 6 pages.*
Shinagawa et al., BitVisor: a thin hypervisor for enforcing i/o device security, Mar. 2009, 10 pages.*
USPTO, Office Action for U.S. Appl. No. 12/708,311 mailed Apr. 11, 2012.
USPTO, Final Office Action for U.S. Appl. No. 12/708,311 mailed Oct. 26, 2012.
USTPO, Advisory Action for U.S. Appl. No. 12/708,311 mailed Dec. 31, 2012.
USPTO, Notice of Allowance for U.S. Appl. No. 12/708,311 mailed Sep. 12, 2013.

* cited by examiner

*Primary Examiner* — Thuy Dao
(74) *Attorney, Agent, or Firm* — Lowenstein Sandler LLP

(57) ABSTRACT

A method and system for providing guest software updates to a host computer system. The hypervisor in the host computer system downloads an update to guest software that runs on a virtual machine associated with the hypervisor. The hypervisor determines the content of the update to be sent to the virtual machine. The hypervisor then sends the content of the update to the virtual machine via a dedicated channel between the hypervisor and the virtual machine. Thus, a guest without external networking or even no network stack can be updated.

20 Claims, 5 Drawing Sheets

DOWNLOADING GUEST SOFTWARE UPDATES BY A HYPERVISOR

TECHNICAL FIELD

The embodiments of the invention relate generally to virtualization systems and, more specifically, relate to management of guest software updates.

BACKGROUND

A virtual machine (VM) is a portion of software that, when executed on appropriate hardware, creates an environment allowing the virtualization of an actual physical computer system. Each VM may function as a self-contained platform, running its own software (OS) and software applications (processes). A host machine (e.g., computer or server) is typically enabled to simultaneously run multiple VMs, where each VM may be used by a local or remote client.

Within the host machine, a hypervisor manages allocation and virtualization of computer resources for the VMs and performs context switching, as may be necessary, to cycle between various VMs. The hypervisor allocates a certain amount of the host's resources to each of the VMs. Each VM is then able to use the allocated resources to execute applications, including softwares known as guest softwares. The hypervisor virtualizes the underlying hardware of the host machine or emulates hardware devices, making the use of the VM transparent to the guest software or the remote client that uses the VM.

Frequently, some of the VMs managed by a hypervisor do not have an external connection to the outside network, or have its network stack completely disabled. The isolation of the VMs from external public networking is desired for security purposes.

A problem encountered by the lack of connection to the external network by the VMs is updating the guest software. All of the VMs sometimes need to receive software updates from the external network; for example, for urity fixes, standard bug fixes and new features. A VM that is not hooked into external public networking cannot easily enjoy the benefits of receiving software updates from an OS vendor.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Described herein is a method and system or providing guest updates to a host computer system. In one embodiment, a hypervisor in a host computer system downloads an update to guest software that runs on a virtual machine associated with the hypervisor. The hypervisor determines the content of the update to be sent to the virtual machine. The hypervisor then sends the content of the update to the virtual machine via a dedicated channel between the hypervisor and the virtual machine. Thus, a guest without external networking or even no network stack can be updated.

Embodiments of the invention provide a mechanism for downloading guest updates through a hypervisor, using a dedicated channel ("VM channel") between the host and each guest for streaming guest software updates into the VM. Embodiments of the invention allow the hypervisor to have full control of the update content and timing. A system administrator can have the option of determining which VMs will receive updates. A system administrator can also determine the extent of the updates; for example, whether to provide security fixes only, or to provide fixes to all kinds of bugs. The update content that a VM is allowed to receive can be per-component-based; for example, a VM may receive graphical user interface (GUI) fixes but not database updates.

Embodiments of the invention free a guest from the tasks of downloading and managing updates by itself. Instead, a hypervisor can obtain all of the updates for all of its guests. Thus, a guest without Internet access or even without networking capability can continue to receive updates through the hypervisor and a dedicated VM channel.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
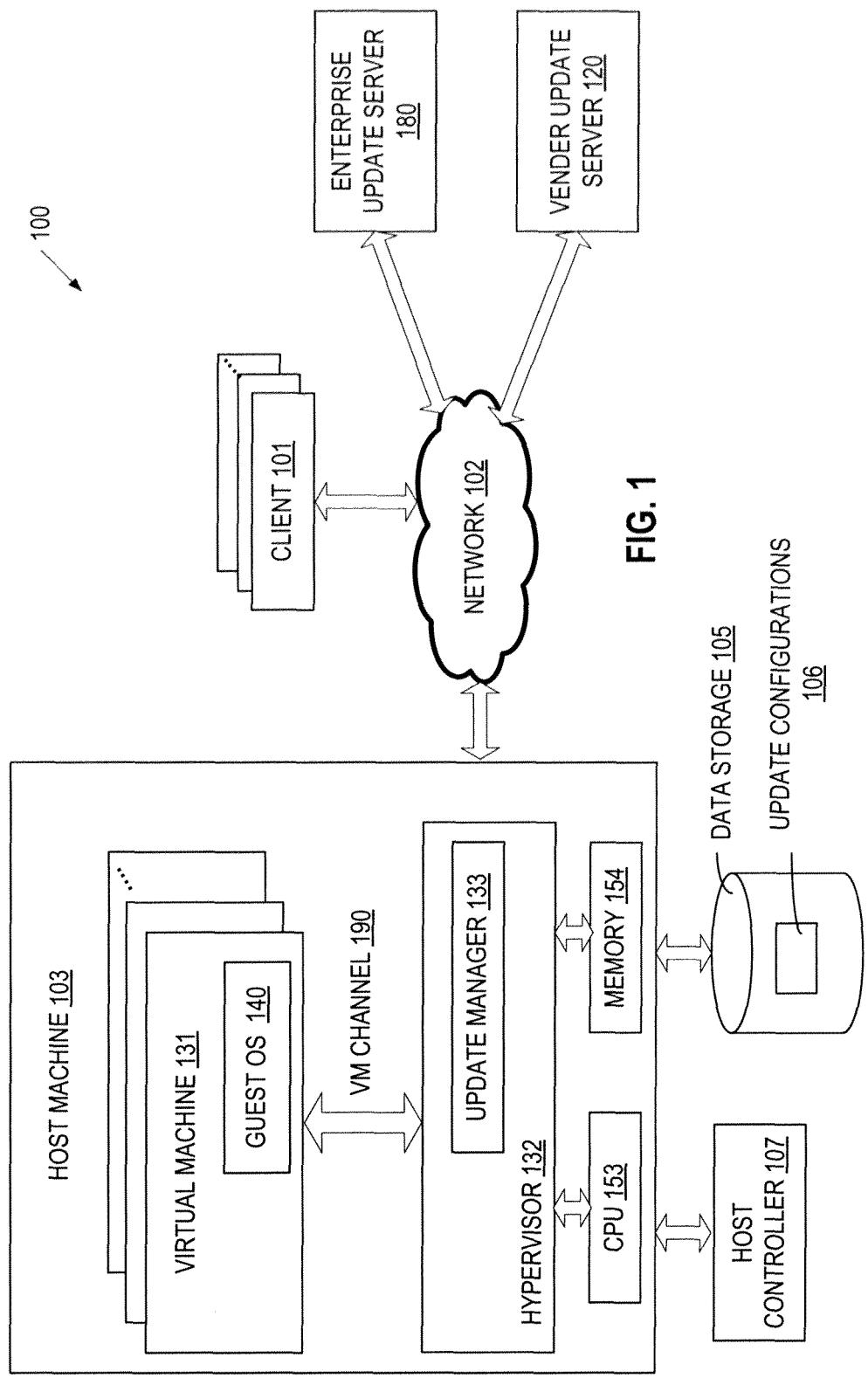
FIG. 1 is a block diagram of an exemplary network architecture in which embodiments of the present invention may operate.

FIG. 1 illustrates an exemplary network architecture 100 in which embodiments of the present invention may operate. The network architecture 100 may include a host machine 103 (also referred to as a "host" or a "host computer system") coupled to one or more clients 101 over a network 102. The host 103 may be a server computer or a cluster of server computers. The network 102 may be a private network (e.g., a local area network (LAN), wide area network (WAN), intranet, etc.) or a public network (e.g., the Internet). In other embodiments, the host 103 and clients 101 may be part of the same machine. The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more virtual machines (VMs) 131. Each VM 131 runs a guest software (OS) 140 that may be the same or different from one another. The guest OS 140 may include Microsoft Windows®, Linux®, Solaris®, Mac® OS, Red Hat® Enterprise Linux (RHEL) and Microsoft® Hyper-V, etc. The host 103 also includes a hypervisor 132 that virtualizes the underlying hardware platform (e.g., one or more CPUs 153, memory 154, I/O, etc.) for the VMs 131. The hypervisor 132 may also be known as a VM monitor (VMM) or a kernel-based hypervisor. In one embodiment, the hypervisor 132 may be part of a host OS. Through the hypervisor 132, the VMs 131 share the use of the CPU 153 and are executed by the CPU 153.

Each VM 131 can be accessed by one or more of the clients 101. In one scenario, the VM 131 can provide a virtual desktop for the client 101. The VMs 131 can be managed by the host controller 107. The host controller 107 may also add a VM, delete a VM, balance the load on the server cluster, provide directory service to the VMs 131, and perform other management functions.

Embodiments of the invention enable automatic updates to each VM 131 via the hypervisor 132, using a VM channel 190 dedicated for passing data between the hypervisor 132 and the VM 131. The hypervisor 132 is connected to an external network (e.g., the network 102). In one embodiment, the hypervisor 132 is able to communicate with an external update service (e.g., a vendor update server 120, an enterprise update server 180, etc.) through the network 102 on behalf of the VMs 131 that do not have external network connections or are disabled from communicating with external networks. In another embodiment, the hypervisor 132 may communicate with an external update service on behalf of all of the VMs 131, even though some of the VMs 131 are capable of directly communicating with external networks. After the hypervisor 132 downloads the updates, the updates can be provided to each VM 131 over the dedicated VM channel 190 between the hypervisor 132 and the VM 131.

In one embodiment, the updates may be provided by a standard OS update service; for example, by Red Hat® Network (RHN) or Microsoft®. Utilizing a network connection to the vendor update server 120, the hypervisor 132 may obtain necessary updates for each VM 131. Alternatively or additionally, an enterprise may use a centralized enterprise update service; for example, the enterprise update server 180 provided by RHN satellite or Microsoft®' to download the updates from the vendor update server 120. The enterprise update server 180 stores the downloaded updates, which can then be downloaded by the hypervisor 132. The update mechanism described herein applies to guest OS updates, guest user space application updates, or other guest software updates. Although guest OS updates is described as an example below, it is understood that the following description applies to the updates to all of the guest software.

In some scenarios, software updates may expose new bugs and regressions, and may cause service downtime for a short period of time. Therefore, a system administrator and/or users of the VM 131 may not want to receive updates, or may want to receive updates at a specific time. In one embodiment, the hypervisor 132 has full control of the update content and timing. The hypervisor 132 may perform the updates according to update configurations 106 that are specified by a system administrator and/or users of the VM 131. In one embodiment, the update configurations 106 may specify, on a per-guest, per-user, and/or per-OS-brand basis, about what update content to provide to a VM and when to provide the update content. The update configurations 106 may specify which VMs can receive updates, what content can be received by each VM, the timing when a VM can receive an update (e.g., after a task running on the VM is completed), whether to provide security fixes only or fixes to all bugs, etc. In one embodiment, the update configurations 106 may specify, for each component that runs on a VM, whether an update is permitted. For example, a VM may be allowed to receive GUI fixes, but not allowed to receive database updates.

In one embodiment, the update configurations 106 are stored in data storage 105 accessible to the host 103. The data storage 105 may include memory devices, such as random access memories (RAMs), or mass storage devices, such as magnetic or optical storage based disks, tapes or hard drives. The data storage 105 may be located within the host 103 (e.g., in an internal memory of the host 103) or external to the host 103.

In one embodiment, the hypervisor 132 may include an update manager 133 to download updates via the network 102 and to forward appropriate updates to each VM 131. The update manager 133 keeps track of the OS brand and software release version number of each guest OS that runs on the VMs 131. The update manager 133 can download and forward updates to the VMs 131 that have the same OS brand as the host 103, whether or not their respective software release numbers are the same as the host 103. In a scenario where some of the VMs 131 have the same software release number (as well as the same OS brand as the host 103), the update manager 133 may forward a downloaded update to all of the guest OSes of these VMs 131 at the same time. In another scenario where the host 103 and the VM 131 runs different OS brands (e.g., a Linux® hypervisor managing a Windows® VM), a special Application Programming interface (API) of the guest OS is needed for the update mechanism to work. In most cases, the special API is not published and locked to the OS vendor.

Once the updates are downloaded by the hypervisor 132, the hypervisor 132 forwards these updates into the VMs 131 through the VM channels 190. Each VM 131 has an associated VM channel 190 dedicated for passing data between the VM 131 and the hypervisor 132. In one embodiment, the updates are signed by the update service provider to show its authenticity. The VM 131 reads from the associated VM channel 190 and verifies the signature. The updates will be installed on the VM 131 if the signature is verified.

In one embodiment of the hypervisor 132, the VM channel 90 contains two major parts.

First, at the hypervisor 132 side: this is where the emulation of virtual hardware takes place. The hypervisor 132 emulates a Peripheral Component Interconnect (PCI) device that uses a standard (e.g., ring) buffer to pass data to/from the guest. The emulated device is part of the hypervisor 132.

Second, at the guest side: the guest contains a device driver in the kernel and a userspace tool to communicate with the driver. Through a userspace API, one can read/write data and pass it from the guest to the host 103 and vise verse. The driver either comes with the OS (e.g., Linux®) or can be installed on top of it (e.g., Windows®)

Figure 2:
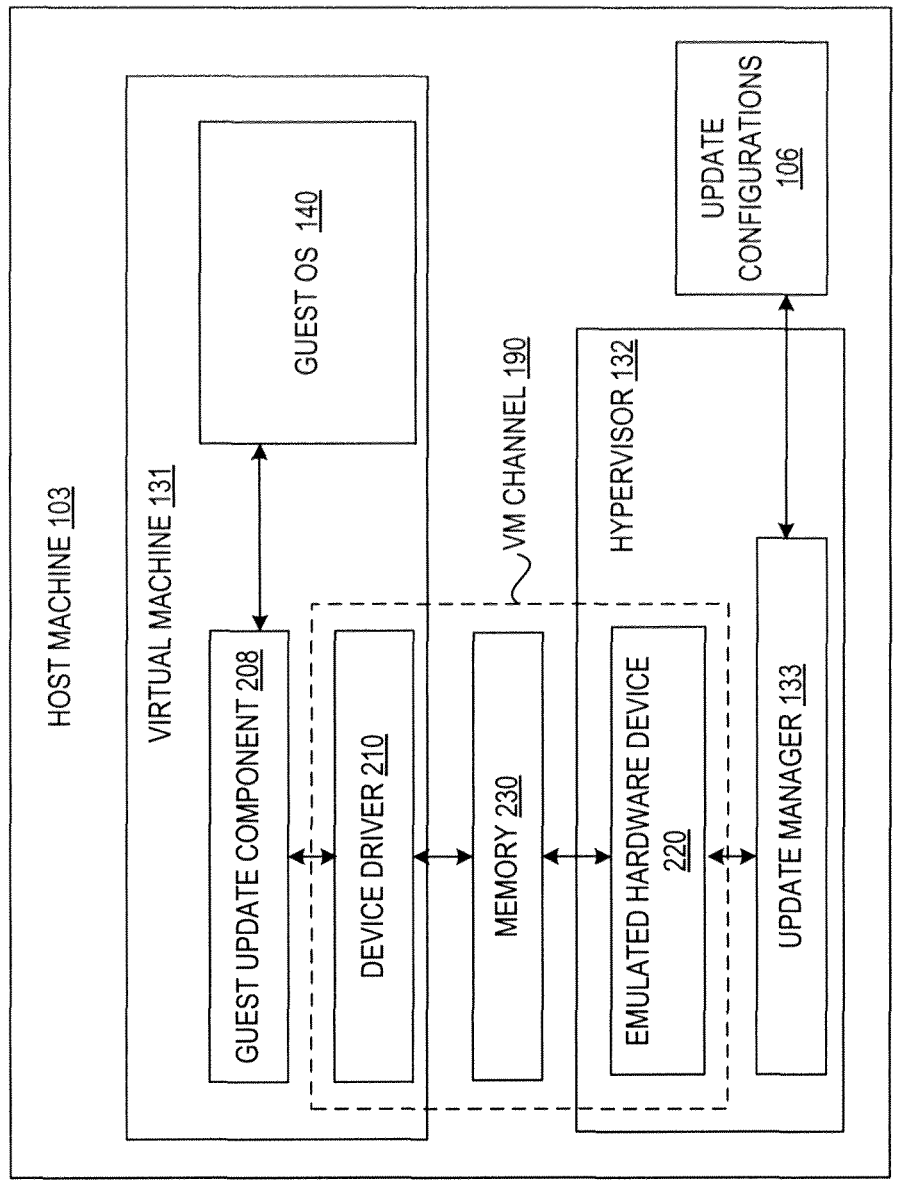
FIG. 2 is a block diagram of one embodiment of a host machine that may represent a server or a cluster of servers hosting virtual machines.

FIG. 2 is a block diagram of one embodiment of the host machine 103 that includes the update manager 133 in the hypervisor 132 to manage updates to the VMs 131. Each VM 131 includes a guest update component 208 coupled to the VM channel 190 to receive updates from the hypervisor 132 and to install the updates on the VM 132.

Once the update manager 133 has obtained a guest update, the update manager 133 checks the update configurations 106 to determine which VMs 131 should receive the update, as well the update content and timing to send to the VMs 131.

After checking the update configurations 106, the update manager 133 passes the appropriate update to the guest update component 208 through the VM channel 190 between the VM 131 and the hypervisor 132. In one embodiment, the VM channel 190 is an emulation of a hardware device (e.g., a Peripheral Component Interconnect (PCI) device) that is exposed to the VM 131 by the hypervisor 132. In one embodiment, the VM channel 190 includes an emulated hardware device 220 on the hypervisor 132 side and a device driver 210 on the VM 131 side. The emulated hardware device 220 and the device driver 210 use a memory 230, which is accessible to both the emulated hardware device 220 and the device driver 210, to pass data between the hypervisor 132 and the VM 131. When an update is passed to the VM 131, the guest update component 208 reads the update from the VM channel 190 and installs the update on the VM 131. In one embodiment, a digital signature is attached to the update to prove authenticity of the update. The signature is verified by either the update manager 133 or the guest update component 208 before the update is installed on the VM 131.

The installation of the guest update component 208 and the device driver 210 may be performed by the host controller 107, the VM 131, the hypervisor 132, or a combination of the above. In one embodiment, the guest update components 208 and/or the device driver 210 may be installed upon initialization of the VM 131, or during operation of the VM 131.

Figure 3:
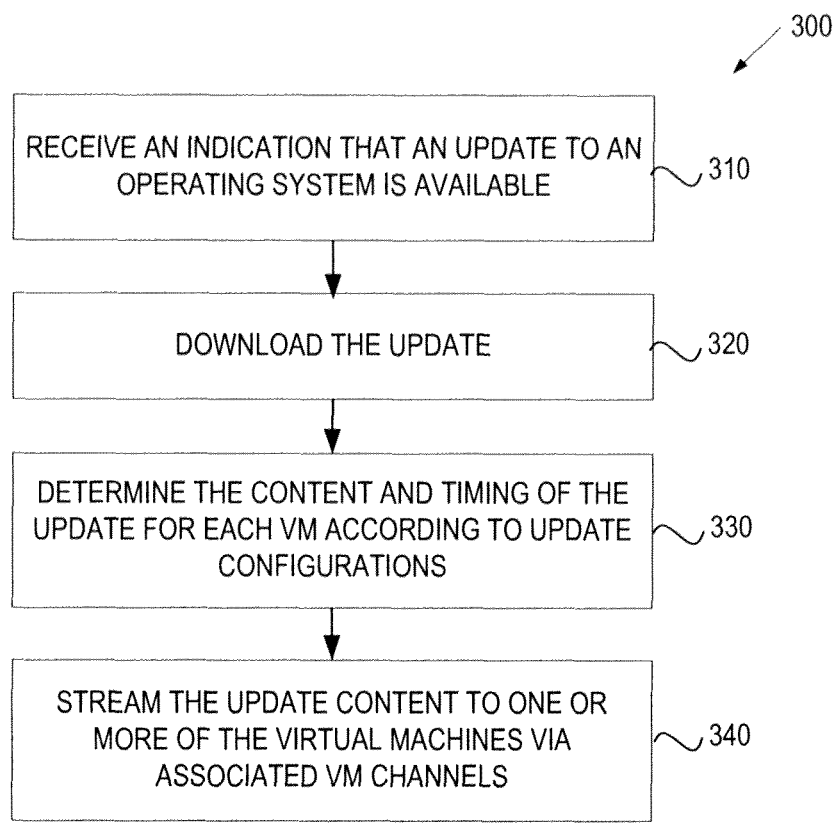
FIG. 3 is a flow diagram illustrating a method performed by a hypervisor for downloading guest updates according to an embodiment of the invention.

FIG. 3 is a flow diagram illustrating a method 300 performed by a hypervisor for downloading guest OS updates according to an embodiment of the invention. The method 300 may be performed by a computer system 500 of FIG. 5 that may comprise hardware (e.g., circuitry, dedicated logic, programmable logic, microcode, etc.), software (such as instructions run on a processing device), or a combination thereof. In one embodiment, the method 300 is performed by the host machine 103, and specifically by the update manager 133 in the hypervisor 132, of FIGS. 1 and 2.

In one embodiment, the method 300 begins when the hypervisor 132 receives a notification that an update to an OS is available (block 310). The notification may be received by the hypervisor 132 in the form of an event that signals the availability of the update. The event may be sent by an update service provider, such as the vendor update server 120 or the enterprise update server 180 of FIG. 1. In one embodiment, the hypervisor 132 may pre-register the OS brands and release version numbers of its guest OSes with the update service provider to receive notifications when an appropriate update for a guest OS is available (e.g., an update that matches the OS brand and release version number of a guest OS). Alternatively, upon receiving the notification that an update is available, the hypervisor 132 may search the available updates at the update service provider to locate an appropriate update for its guest OSes. The hypervisor 132 then downloads the appropriate update (block 320). In another embodiment, the hypervisor 132 polls the update service provider at a predetermined interval to determine whether an update to a guest OS is available. If the hypervisor 132 finds an appropriate update for one or more of its guest OSes (e.g., an update that matches the OS brand and release version number of a guest OS), the hypervisor 132 downloads the appropriate update (block 320).

Subsequently, the hypervisor 132 determines, according to predetermined update configurations, which of its associated VMs should receive the update, what update content to send, and when to send the update (block 330). The hypervisor 132 then streams the appropriate content to each VM 131 that is configured to receive the updates via the VM channel 190 associated with the VM 131 (block 340).

In one embodiment, an OS vendor can sign every small update with a private key. Both the hypervisor 132 and the guest OS 140 can have the public key and verify the signature in accordance with any standard signing mechanism. In an embodiment where signing is used, the hypervisor 132 checks a digital signature of all updates upon receipt of the updates in order to determine if the update is authentic. The update is specifically signed so that unsecured software can-not be installed on the VM 131. If the update is signed correctly (and, therefore, is determined to be authentic), then the hypervisor 132 proceeds to stream the update. In one embodiment, a digital signature of the update is checked against a digital signature known at the hypervisor 132 to determine authenticity. One skilled in the art will appreciate that there are a variety of techniques to determine authenticity of the update and any of these may be utilized. Nevertheless, since the hypervisor 132 is considered a reliable source and it is the hypervisor 132 that sends the update, the above signing mechanism can be optional.

Figure 4:
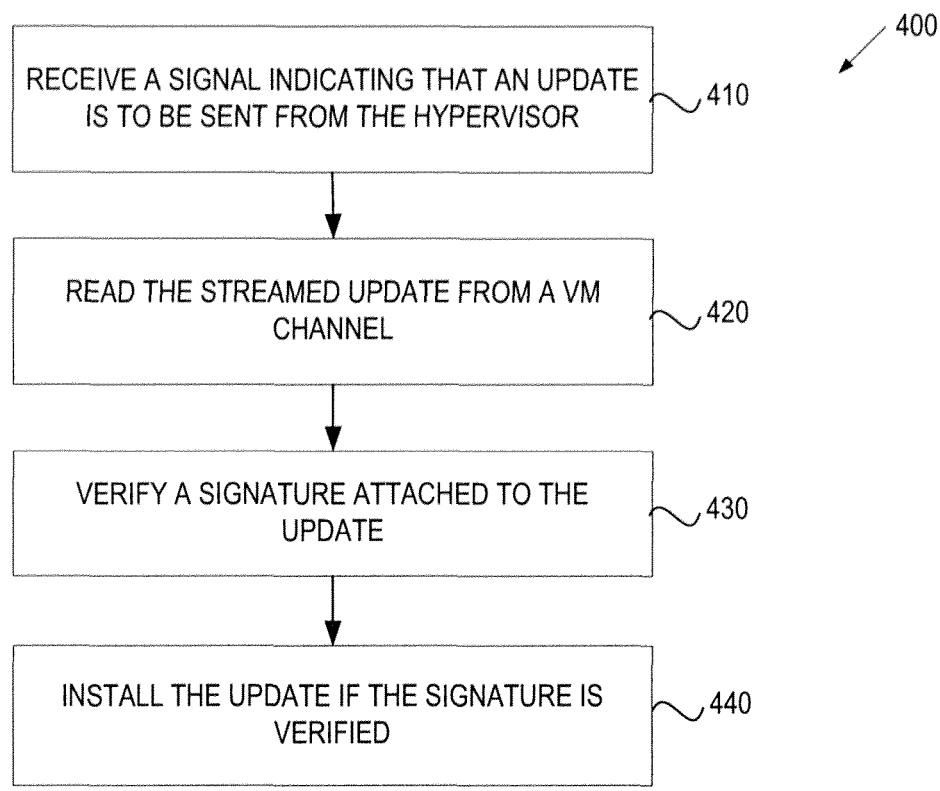
FIG. 4 is a flow diagram illustrating a method performed by a VM for obtaining guest updates using a VM channel according to an embodiment of the invention.

FIG. 4 is a flow diagram illustrating a method 400 performed by a VM for obtaining guest OS updates according to an embodiment of the invention. The method 400 may be performed by a computer system 500 of FIG. 5 that may comprise hardware (e.g., circuitry, dedicated logic, programmable logic, microcode, etc.), software (such as instructions run on a processing device), or a combination thereof. In one embodiment, method 400 is performed by VM 131 of FIGS. 1 and 2.

In one embodiment, the method 400 begins at block 410 when a guest update component (e.g., the guest update component 208 of FIG. 2) in the VM 131 receives a signal from the hypervisor 132 indicating that an update is going to be sent from the hypervisor 132 (block 410). The guest update component 208 is communicably coupled to the VM channel 190 from which updates from the hypervisor 132 are to be received. The guest update component 208 then reads streamed update content from its associated VM channel (block 420).

In one embodiment, the hypervisor 132 does not verify the digital signature attached to the update before streaming the update. Instead, the guest update component 208 verifies the digital signature attached to the update (block 430). The digital signature of the update may be checked against a digital signature known at the guest update component 208 to determine authenticity. The update is installed on the VM 131 if the signature is verified as authentic (block 440).

In some cases, a reboot of the VM 131 may be required depending on the component being updated. For example, if a guest OS kernel is being updated, a reboot of the VM 131 is required. On the other hand, if the update is for one of the guest userspace daemons, then no reboot is needed.

Figure 5:
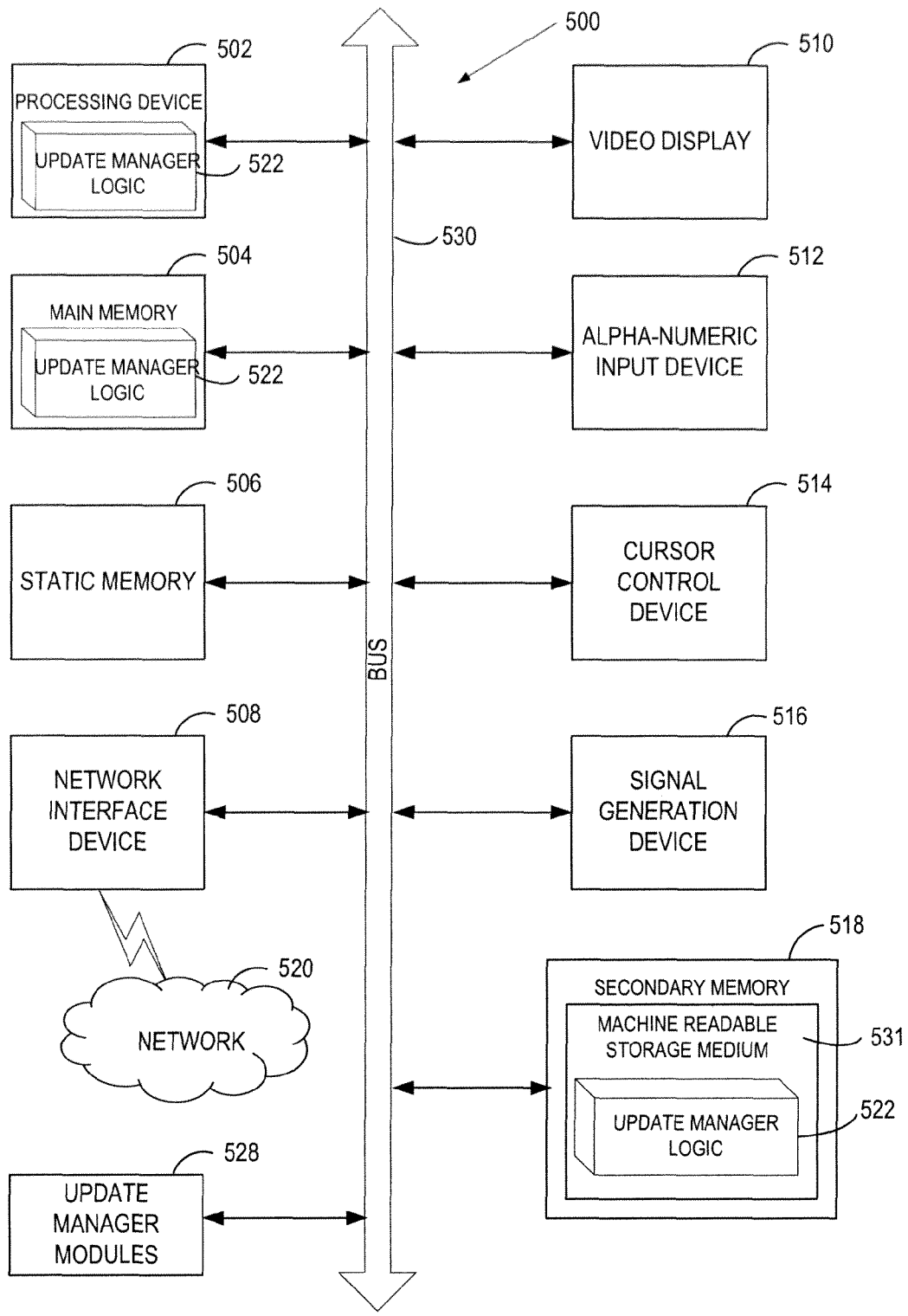
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer, (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute update manager logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., update manager logic 522) embodying any one or more of the methodologies or functions described herein (e.g., the update manager 133 of FIGS. 1 and 2). The update manager logic 522 may also reside, completely or at least partially, within the main memory 504 and/or within the processing device 502 during execution thereof by the computer system 500; the main memory 504 and the processing device 502 also constituting machine-readable storage media. The update manager logic 522 may further be transmitted or received over a network 520 via the network interface device 508.

The machine-readable storage medium 531 may also be used to store the update manager logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include update manager modules 528 for implementing the functionalities of the update manager 133 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "downloading", "determining", "sending", "checking", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a host computer system, comprising:
   downloading, by a hypervisor in the host computer system, an update to guest software that runs on a first virtual machine and a second virtual machine associated with the hypervisor;
   determining, by a processing device executing the hypervisor, content of the update to be sent to the first virtual machine and the second virtual machine; and
   sending, by the hypervisor, the content of the update to the first virtual machine via a first dedicated channel and to the second virtual machine via a second dedicated channel, the first dedicated channel being dedicated to providing guest software updates to the first virtual machine and the second dedicated channel being dedicated to providing the guest software updates to the second virtual machine, wherein the first and second dedicated channels are distinct, and at least one of the first and second channels comprises an emulated hardware device in the hypervisor and a device driver in a respective virtual machine, wherein the emulated hardware device is to store the content of the update in memory accessible by the device driver to provide the content of the update to the respective virtual machine.

2. The method of claim 1, further comprising:
   verifying that the update is authentic; and
   installing the update if the update is verified to be authentic.

3. The method of claim 1, further comprising:
   determining, by the hypervisor, when to send the update to the first virtual machine and the second virtual machine according to respective update configurations accessible to the hypervisor.

4. The method of claim 1, wherein determining content of the update further comprises:
   checking, by the hypervisor, update configurations to determine whether one or more components of the guest software are allowed to be updated; and
   sending, by the hypervisor, the update to the first virtual machine and the second virtual machine for the one or more components that are allowed to be updated.

5. The method of claim 1, wherein the host computer system manages a plurality of virtual machines comprising the first virtual machine and the second virtual machine, the method further comprising:
   determining, by the hypervisor, which of the plurality of virtual machines is to receive the update.

6. The method of claim 1, wherein sending the content of the update to the first virtual machine further comprises:
   exposing an emulated hardware device to the first virtual machine; and
   passing data to a corresponding device driver in the first virtual machine via a memory accessible by the hypervisor and the first virtual machine.

7. The method of claim 1, wherein downloading an update further comprises:
   downloading an update to a software operating system having a release version number; and
   sending the update to the first and second virtual machines that run the operating system having the release version number.

8. A system, comprising:
   a processor;
   a memory communicably coupled to the processor; and
   a virtual machine having access to the memory and sharing use of the processor with one or more other virtual machines, the virtual machine configured to:
   obtain an update from a hypervisor via a dedicated channel between the hypervisor and the virtual machine, the dedicated channel being dedicated to providing guest software updates to the virtual machine and comprising an emulated hardware device in the hypervisor and a device driver in the virtual machine, wherein the emulated hardware device is to store the content of the update in memory accessible by the device driver to provide the content of the update to the respective virtual machine, and
   install the update on the virtual machine in response to a determination that a signature of the update is verified.

9. The system of claim 8, wherein the virtual machine has no connection or has disabled connection to external networks.

10. The system of claim 8, wherein the update is to update a guest operating system of the virtual machine.

11. The system of claim 8, wherein the device driver in the virtual machine is to use the memory to receive the update from an emulated hardware device in the hypervisor.

12. The system of claim 8, further comprising:
    data storage to store update configurations for the virtual machine, wherein the update configurations specify timing and content of the update to be received by the virtual machine.

13. The system of claim 12, wherein the update configurations further specify, for each component of guest software that runs on the virtual machine, whether the component is allowed to be updated.

14. A non-transitory computer readable storage medium including instructions that, when executed by a processing system, cause the processing system to perform a method comprising:
    downloading, by a hypervisor in a host computer system, an update to guest software that runs on a first virtual machine and a second virtual machine associated with the hypervisor;
    determining, by the hypervisor, content of the update to be sent to the first virtual machine and the second virtual machine; and
    sending, by the hypervisor, the content of the update to the first virtual machine via a first dedicated channel and to the second virtual machine via a second dedicated channel, the first dedicated channel being dedicated to providing guest software updates to the first virtual machine and the second dedicated channel being dedicated to providing the guest software updates to the second virtual machine, wherein the first and second dedicated channels are distinct, and at least one of the first and second channels comprises an emulated hardware device in the hypervisor and a device driver in a respective virtual machine, wherein the emulated hardware device is to store the content of the update in memory accessible by the device driver to provide the content of the update to the respective virtual machine.

15. The computer readable storage medium of claim 14, further comprising:
    verifying that the update is authentic; and
    installing the update if the update is verified to be authentic.

16. The computer readable storage medium of claim 14, further comprising:

determining, by the hypervisor, when to send the update to the first virtual machine and the second virtual machine according to respective update configurations accessible to the hypervisor.

17. The computer readable storage medium of claim 14, wherein determining content of the update further comprises:
checking, by the hypervisor, update configurations to determine whether one or more components of the guest software are allowed to be updated; and
sending, by the hypervisor, the update to the first virtual machine and the second virtual machine for the one or more components that are allowed to be updated.

18. The computer readable storage medium of claim 14, wherein the host computer system manages a plurality of virtual machines comprising the first virtual machine and the second virtual machine, the method further comprising:
determining, by the hypervisor, which of the plurality of virtual machines is to receive the update.

19. The computer readable storage medium of claim 14, wherein sending the content of the update to the first virtual machine further comprises:
exposing an emulated hardware device to the first virtual machine; and
passing data to a corresponding device driver in the first virtual machine via a memory accessible by the hypervisor and the first virtual machine.

20. The computer readable storage medium of claim 14, wherein downloading an update further comprises:
downloading an update to a guest software having a release version number; and
sending the update to the first and second virtual machines that run the operating system having the release version number.

* * * * *